UNITED STATES PATENT OFFICE.

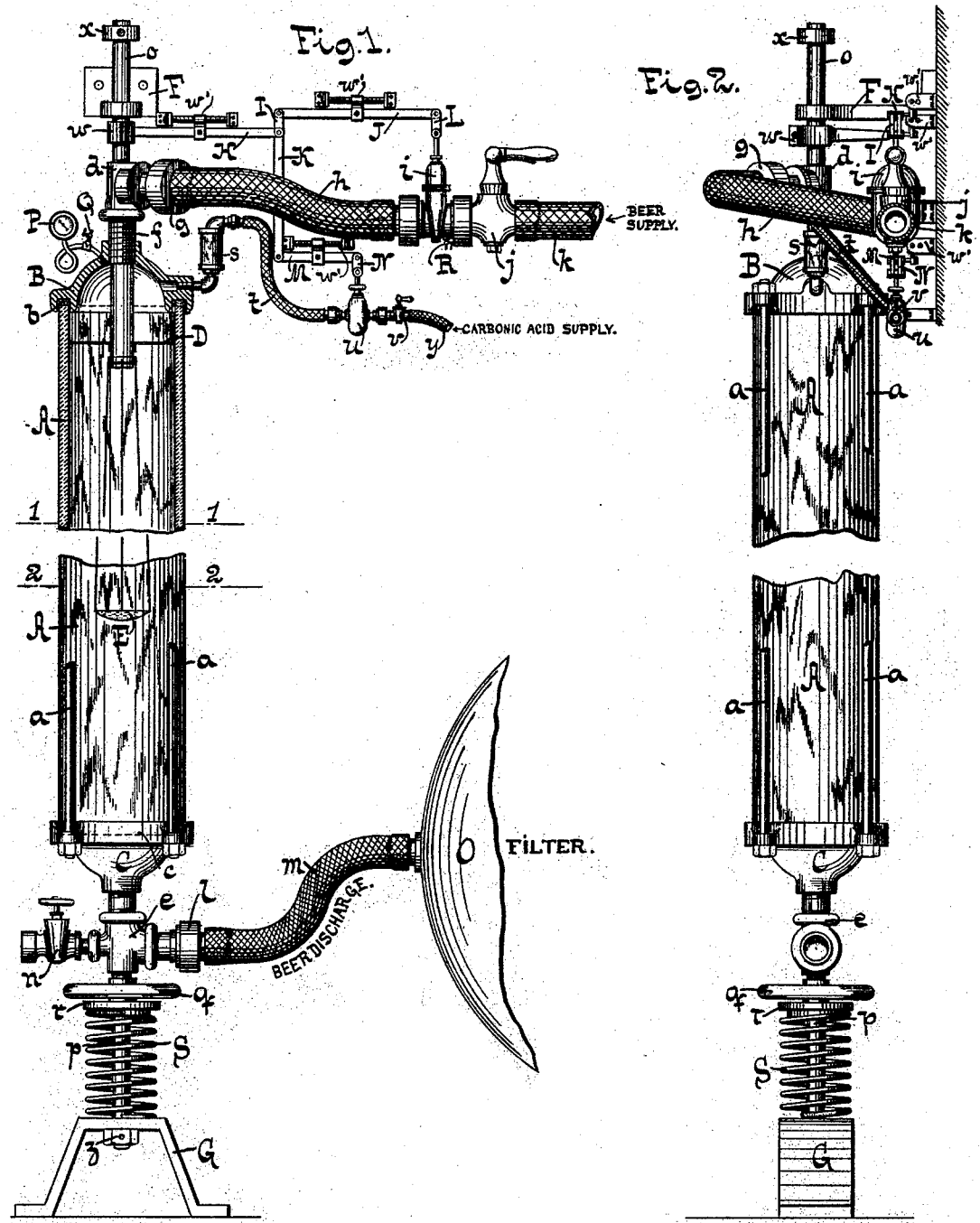

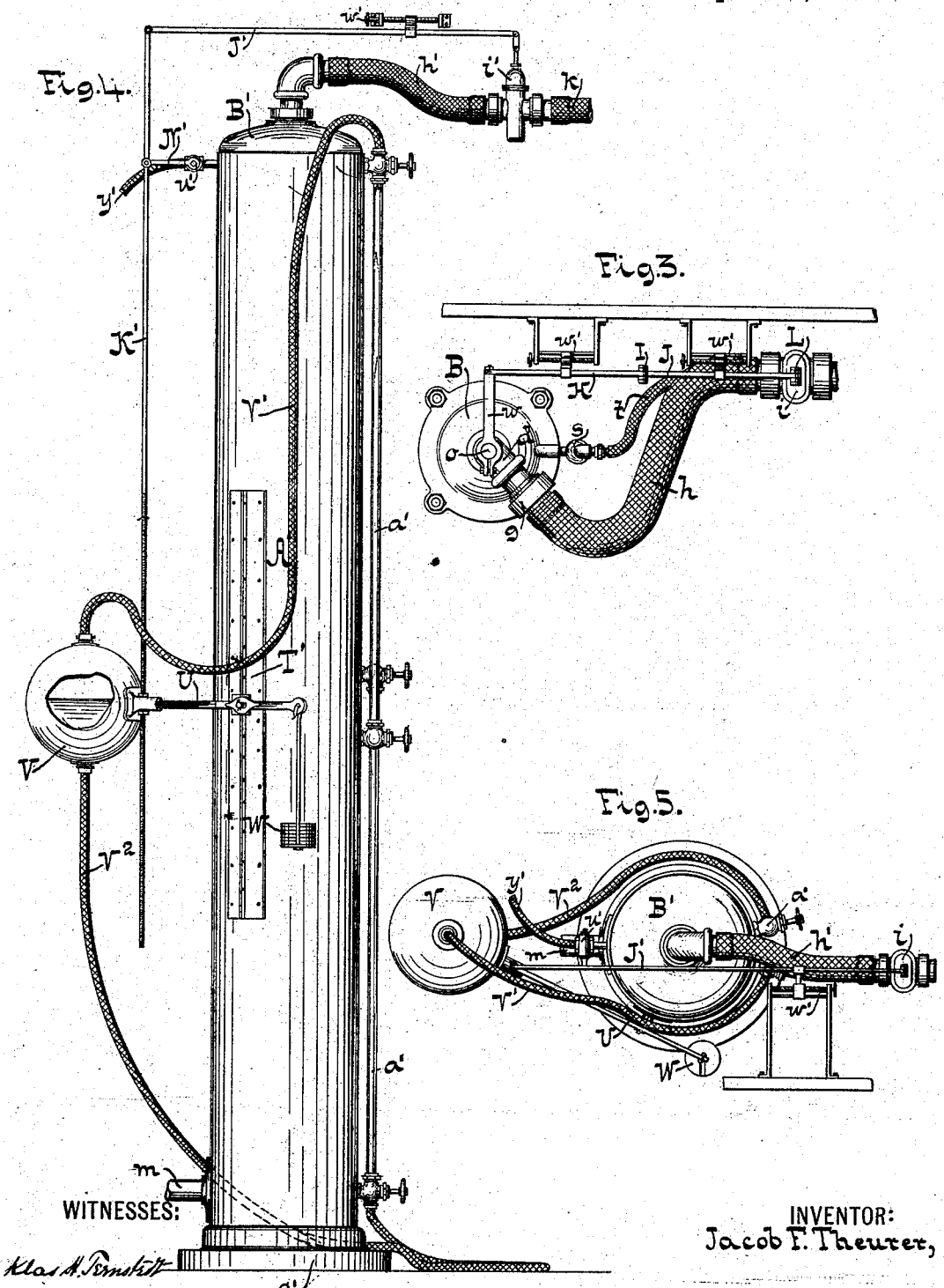

JACOB F. THEURER, OF MILWAUKEE, WISCONSIN, ASSIGNOR TO THE UNIVERSAL CARBONATING COMPANY, OF NEWARK, NEW JERSEY.

APPARATUS FOR CHARGING LIQUIDS WITH CARBONIC-ACID GAS.

SPECIFICATION forming part of Letters Patent No. 505,239, dated September 19, 1893.

Application filed January 24, 1893. Serial No. 459,596. (No model.)

*To all whom it may concern:*

Be it known that I, JACOB F. THEURER, a citizen of the United States, and a resident of Milwaukee, in the county of Milwaukee and State of Wisconsin, have invented certain new and useful Improvements in Apparatus for Charging Liquids with Carbonic-Acid Gas, of which the following is a specification.

My invention consists in a new and improved carbonic acid charger to be used principally for the impregnation of beer and other malt liquors in connection with apparatus such as referred to in United States Letters Patent No. 478,176, dated July 5, 1892, granted to John B. Stobaeus and Frederick C. Wackenhuth.

The nature of my said invention will best be understood when described in connection with the accompanying drawings, in which—

Figure 1 represents a front elevation, partly in section, of the charger and connections. Fig. 2 is a side elevation thereof. Fig. 3 is a plan view. Fig. 4 is a front elevation of a modified form of charger. Fig. 5 is a plan view of the same.

Similar letters indicate corresponding parts throughout the several views of the drawings.

Referring now in particular to the apparatus shown in Figs. 1, 2 and 3, the letter A designates a cylinder, which with its heads B and C constitutes a vertical charging vessel. The cylinder A, I make by preference of glass, so as to be enabled to dispense with extra gages for indicating the level of liquid in the same, and secure it between the two heads by means of suitable bolts $a\, a$. In said heads are formed suitable annular grooves $b$ and $c$ into which a proper packing is placed before the ends of the cylinder are inserted. The pipe $f$, through which the liquid to be impregnated is passed into the cylinder A, is screwed vertically into the head B, and, by preference, projects some distance into the cylinder. Near its lower end the pipe carries a foraminous disk D fitted loosely into the cylinder and forming a foam breaker.

E is a dash plate suspended from the pipe and arranged in line with the same.

The liquid is supplied to pipe $f$ through a T or fitting $d$, a coupling $g$, a flexible hose $h$, regulating valve $i$, stop cock $j$ and the hose $k$ leading to the source of liquid supply; all of which parts taken collectively I shall hereinafter term the liquid supply pipe, although my invention is not restricted to the particular component parts or to their arrangement in the supply pipe as herein set forth.

The supply pipe for the carbonic acid enters the charging vessel horizontally through the upper head B and as here shown embraces the following principal parts, to wit: a flexible tube $y$ leading to the source of gas supply, a cock or reducing valve $v$, a regulating valve $u$, a flexible tube $t$ and a check valve $s$. The check valve $s$ is of that type which under ordinary circumstances permits the passage of gas into the charging vessel, but in case the liquid rises to an abnormal height and enters the valve, the egress of said liquid is prevented.

The impregnated liquid is conducted from the charging vessel by the hose $m$, connected to the lower head C by a fitting $e$ and coupling $l$,—all said parts constituting the discharge pipe.

To the fitting $e$ is connected a cock $n$ through which water may be admitted to or drawn off from the charging vessel.

P is a pressure gage connected with the charging vessel.

Q is an air cock placed in the connecting pipe of the same, and R is a second air cock located at the bottom of valve $i$.

The charging vessel is supported upon a suitable adjustable elastic cushion and is free to move vertically, suitable guides being provided to steady it. In the example illustrated, stems $o$ and $p$ are screwed into the respective fittings $d$ and $e$, and guided the one by the bracket F and the other by the standard G. On the threaded upper portion of the stem $p$ is located a hand-wheel $q$ provided with a suitable collar or bearing surface $r$.

Between the hand-wheel and the standard G is placed a spiral spring S of the requisite proportions to properly support the charging vessel and contents;—the tension of said spring being adjusted by the hand-wheel $q$.

To the upper stem $o$ is adjustably screwed a collar or stop $x$, by the position of which with respect to the horizontal portion of the bracket F, the extent of the downward motion of the vessel, induced by an increase in the amount of liquid, is limited. A nut $z$ on the lower stem $p$ limits the upward movement of the vessel induced, by a diminution in the amount of liquid, by engaging with the standard G.

The reciprocating movement of the charging vessel is transmitted to the valve $i$ regulating the supply of liquid by any suitable mechanism, for instance as here shown, by a lever H connected to an arm $w$ secured to stem $o$, link I, lever J and link L connected to the stem of valve $i$. The motion is in this instance also transmitted to the valve $u$ regulating the supply of gas, by link K connected with lever H, lever M, and link N attached to the stem of said valve.

The fulcrumage of the respective levers H, J and M is made adjustable in order to obtain the desired range of motion for the valves. Any well known means may be employed for this purpose, such for instance as here shown, where sliding pieces encompassing the levers carry fulcrum pins having bearings in hangers mounted on adjusting screw rods $w'$.

The lever systems for transmitting motion to the valves, and the said valves are so set that when the liquid supply valve $i$ is opening the gas supply valve $u$ is closing, and vice versa.

The collar $x$ on the stem $o$, as well as the position of the charging vessel and the tension of the spring, is so adjusted that the collar will come into contact with the bracket F when the liquid in the charging vessel is at approximately the level indicated by the line 1—1 Fig. 1. The vessel loaded to this level is then in a position to cause the influx of liquid through the regulating valve $i$ to be shut off, while the valve $u$ is wide open. When the level of the liquid falls to that indicated by line 2—2, Fig. 1, the vessel is in the position indicated in said figure and the nut $z$ is in engagement with the standard G. In this position of the vessel the valve $i$ is wide open and the valve $u$ closed to such an extent as to cause a reduction of the pressure in the vessel to the minimum desired for carbonizing.

It is evident that at any intermediate level of the liquid the proper proportions of liquid and gas for uniformly saturating the liquid are obtained.

I will now proceed to describe the operation of the apparatus, assuming that beer is to be impregnated with carbonic acid. The beer supply hose being properly connected is filled with beer up to cock $j$ and the filter O is connected by hose $m$ with coupling $l$; the gas tube $y$ is connected with the source of supply of carbonic acid. A water supply hose is now attached to cock $n$ and the cocks Q and R opened so as to allow water to enter into the cylinder when cock $n$ is opened. Before water enters the charging vessel, the latter is in its highest position, and the nut $z$ on stem $p$ is in engagement with standard G.

The collar $x$ is adjusted to a position about half way down to the horizontal portion of bracket F, so that as water gradually enters the charging vessel it cannot sink far enough to entirely shut off the valve $i$. As the water rises within the vessel, the air is expelled through the cocks Q and R. When water commences to flow through cock R, the latter is turned off and when it flows out through cock Q the latter is likewise turned off. Meanwhile the water has lifted the float in check valve $s$, thus preventing the flow of water into the gas supply pipe. The water supply hose is now disconnected from the cock $n$, the gas supply is turned on and the cock $n$ opened slightly. The gas gradually displaces the water, and when the vessel is filled with gas the collar $x$ is moved back to its original or highest position as shown in Fig. 1. Beer is now admitted to the vessel and the several adjustable parts can be readily set so as to insure proper impregnation. Whenever through an increased resistance due to the clogging of the filter or to other causes, the discharge of beer is retarded, the level in the charging vessel rises. In view of the increased weight the latter sinks and causes the depression of the stem of the regulating valve $i$ so as to reduce the flow of beer, while at the same time the stem of the gas supply valve $u$ is likewise depressed thereby however opening the valve wider to obtain an increased pressure of the gas in the vessel. When however the level of the beer falls, the reverse operations take place, that is to say, the beer supply valve $i$ is opened wider and the gas supply valve $u$ throttled or closed to correspond. In case the level of beer gets very low, the jet of beer falling through so great a height carries with it to the discharge pipe entrained bubbles of the gas which are not absorbed. To avoid this the dash plate E is employed which deflects the liquid and frees the bubbles.

In the modification illustrated in Fig. 4 and 5, the essential difference is that the charging vessel is stationary instead of movable and the regulation of the influx of gas and liquid is accomplished by suitable extraneous devices governed as before by the level of the liquid. Referring now to said figures the letter A' designates the cylinder which is in this instance made of metal and closed at its ends by suitable heads B' and C'. $a'$ $a'$ are gages for indicating the level of the liquid, $k'$ is the supply pipe leading from the source of liquid supply and $y'$ the pipe from the source of gas supply; $i'$ is the liquid supply regulating valve and $u'$ the gas supply regulating valve or cock, all substantially the same as before.

To regulate the supply of liquid and gas I make use of the following device: To the charging vessel at about midway of its height is secured a bracket T' carrying a horizontal vertically adjustable fulcrum pin about which can turn a lever U. To one arm of this lever is secured a hollow sphere V and from the opposite arm is suspended a balance weight W. The sphere is connected to the top and bottom of the charging vessel by flexible tubes $V'$ $V^2$, so that the level of the liquid therein will be at all times the same as that in the charging vessel. The stem of the air supply cock $u'$ is provided with a crank arm $N'$ connected by a link $K'$ with the lever U, and the stem of liquid supply valve $i'$ is connected by a lever $J'$ to the link $K'$ and consequently with the lever U.

It is evident without further description that variations in the level of the liquid will cause the lever U to be turned about its fulcrum, thereby regulating the valves in the manner described with reference to Figs. 1, 2 and 3. In both instances I have shown both the liquid supply regulating valve and the gas supply regulating valve controlled by the governing device. However it is evident that governing the gas supply valve alone would answer the purpose to a certain extent,—therefore I do not wish to restrict myself to governing both valves.

What I claim as new, and desire to secure by Letters Patent, is—

1. In a carbonic acid charger, the combination of a vertical charging vessel, a liquid supply pipe entering said vessel at the top and projecting down into the same a suitable distance, a supply pipe for carbonic acid gas entering the vessel at or near the top and above the lower end of the supply pipe, regulating valves in the supply pipe for liquid and for gas, means substantially as described for automatically operating said valves by the variations of the level of liquid in the charging vessel, and an outlet for the liquid at or near the bottom of the charging vessel, substantially as and for the purpose set forth.

2. In a carbonic acid charger, the combination of a vertical charging vessel, a liquid supply pipe entering said vessel at the top and projecting down into the same a suitable distance, a foraminous plate surrounding the pipe, a dash plate within the charging vessel arranged in line with the pipe, a supply pipe for carbonic acid gas entering the vessel at or near the top, regulating valves in the supply pipes for gas and liquid, means substantially as described for automatically operating said valves by the variations of the level of liquid in the charging vessel, and a discharge pipe for the liquid connected at or near the bottom of the vessel, substantially as and for the purpose set forth.

3. In a carbonic acid charger, the combination of a vertical charging vessel, a liquid supply pipe entering said vessel at the top and projecting down into the same a suitable distance, a supply pipe for carbonic acid gas entering the vessel at or near the top and above the lower end of the liquid supply pipe, regulating valves in the supply pipes for liquid and for gas, means substantially as described for automatically operating said valves by the variations in the level of the liquid in the charging vessel, a discharge pipe for the liquid at or near the bottom of the charging vessel, a stop cock for admitting water into the charging vessel at and drawing it off from the bottom, and air valves at the top of the vessel and at or near the regulating valve in the liquid supply pipe, substantially as and for the purpose set forth.

4. In a carbonic acid charger, the combination of a charging vessel composed of a glass cylinder A and heads B C, an elastic cushion supporting said vessel, a liquid supply pipe flexibly connected to the vessel and entering the same at the top and projecting down into the vessel, a foraminous disk surrounding the portion of the pipe within the vessel, a gas supply pipe flexibly connected to and entering the vessel at or near the top and provided with a regulating valve, means substantially as described for operating the valve by the rise and fall of the charging vessel, a discharge pipe flexibly connected to the vessel at the bottom, a cock $n$ for admitting water into the vessel at, and drawing it off from the bottom, and air cocks, substantially as and for the purpose specified.

5. In a carbonic acid charger the combination of a charging vessel, an elastic cushion supporting said vessel, a liquid supply pipe connected to said vessel entering the same at the top and projecting down into the vessel, a liquid discharge pipe connected to said vessel at the bottom, regulating valves in the supply pipes for liquid and gas, and means substantially as described for automatically regulating the gas supply by the variations of the level of liquid in the charging vessel, substantially as and for the purpose specified.

6. In an apparatus of the character specified, a charging vessel, a spring cushion supporting the same, liquid and gas supply pipes, regulating valves therein connected with the vessel and operated by the rise and fall of the same, and means for adjusting the range of the valves, substantially as described.

In testimony that I claim the foregoing as my invention I have signed my name, in presence of two witnesses, this 18th day of January, 1893.

JACOB F. THEURER.

Witnesses:
FRED PABST, Jr.,
EMIL BEST.